Aug. 4, 1964 R. A. HENLE 3,143,725

NEGATIVE RESISTANCE MEMORY SYSTEMS

Filed March 23, 1960

INVENTOR
ROBERT A. HENLE

BY *Mitchell & Bechert*

ATTORNEYS

United States Patent Office 3,143,725

Patented Aug. 4, 1964

3,143,725

NEGATIVE RESISTANCE MEMORY SYSTEMS

Robert A. Henle, Hyde Park, N.Y., assignor to International Business Machines Corporation, New York, N.Y., a corporation of New York Filed Mar. 23, 1960, Ser. No. 17,187
2 Claims. (Cl. 340—173)

The present invention relates to memory systems of the type which utilizes a plurality of individual bistable elements as memory cells, and more particularly to such memory systems which have improved read-in and read-out characteristics.

In all memory systems, it is necessary to be able to store (read-in) information and to recover (read-out) the stored information. Often, in prior systems, the reading in and reading out of information required the use of complex and expensive ancillary equipment. Furthermore, the read-out frequently had to be destructive in nature; that is, the stored information was removed from the memory system in the process of being read-out.

It is an object of the invention to provide a memory system wherein read-in and read-out may be effected simply and inexpensively.

It is a further object of the invention to provide such a memory system which provides for non-destructive read-out.

In achieving these objects, the invention provides a memory system which utilizes for each of its memory cells a bistable electrical element having a voltage-current relationship which is characterized by a negative resistance region between two positive resistance regions, the element being stable in either of the positive resistance regions. A circuit element which possesses these characteristics is a semiconductor diode which is variously known as the Esaki or tunnel diode. A description of this diode element may be found on page 1201 in the July 1959 issue of the Proceedings of the Institute of Radio Engineers.

A memory system in accordance with the invention may comprise a plurality of conductive lines, each of the lines including a plurality of the above-described bistable electrical elements connected in series relationship. These elements are further arranged in a plurality of rows, each row including one element from each of the lines respectively.

Read-in is effected by switching preselected ones of the elements from one stable state to the other. To this end, the invention provides means for applying a preselected biasing current to selected ones of the lines, and means for applying a switching voltage across the elements in selected ones of the rows, the value of this voltage being such as to switch only the biased elements in the preselected rows.

Non-destructive read-out is effected by means adapted to detect which of the elements in the memory system have been switched by the read-in circuit. One such means provided by the invention comprises an individual sensor for each of the conductive lines in the system, which sensor is adapted to detect a D.C. voltage change in time on its associated line. Another such means provided by the invention utilizes alternating-current input and detection means to provide non-destructive read-out.

A complete understanding of the invention may be obtained from the following detailed description of means forming specific embodiments thereof, when read in conjunction with the appended drawings, in which.

The various characteristics of the tunnel diode which are of interest with respect to the present invention may best be described with reference to FIG. 1 In the voltage-current chart shown therein, the abscissa represents the voltage across the diode and the ordinate represents the current through the diode. It is thus seen that initially, as the voltage across the diode increases, the current through the diode also increases, thereby giving a first region which has a positive resistance characteristic. After reaching a first critical voltage value, $C_1$, however, further increasing the voltage results in decreasing the current through the diode. This second region, therefore, has a negative resistance characteristic. Thereafter, the voltage-current relationship reverses itself upon reaching the critical value $C_2$. Further increasing the voltage beyond that point results in increasing the current through the diode, thereby giving this third region a positive resistance characteristic. It should be noted that due to phenomena inherent therein, the tunnel diode possesses operative stability in either of the positive resistance regions I or III.

Figure 2:
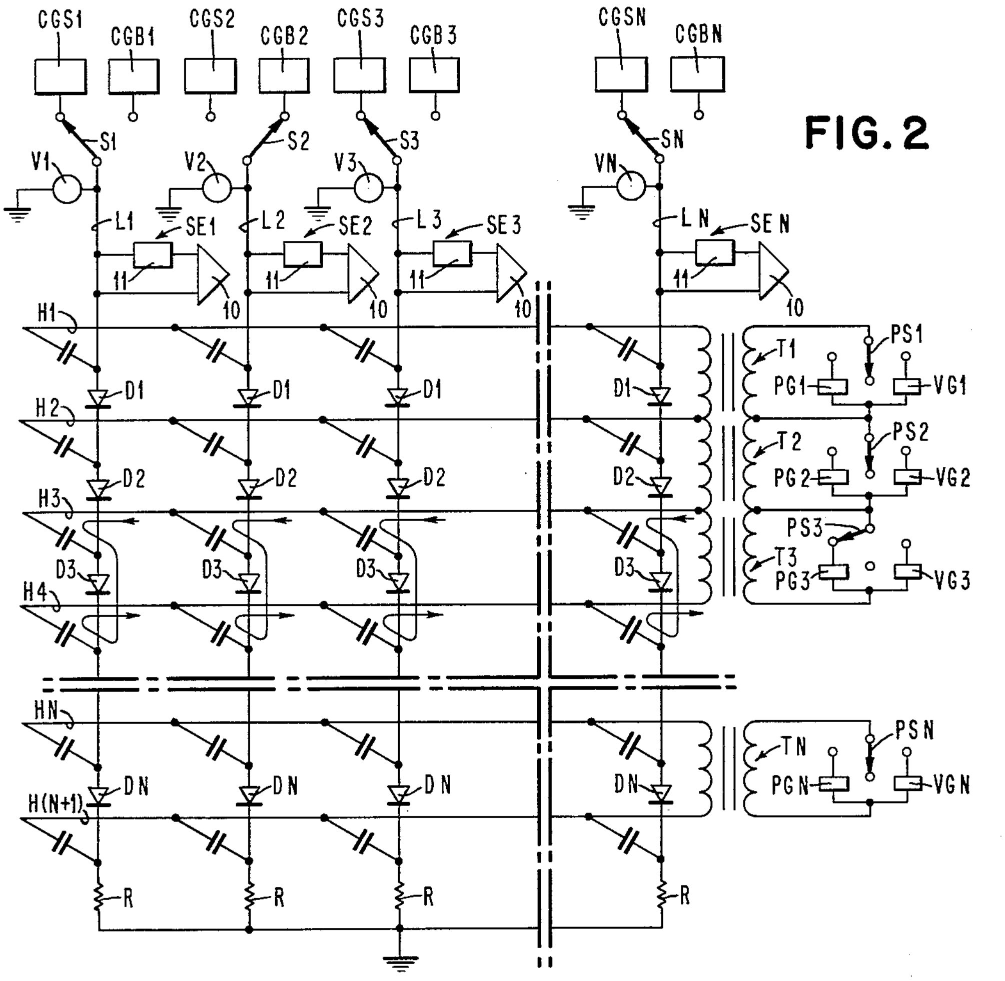
FIG. 2 is a schematic diagram of a memory system in accordance with the invention.

Referring now to FIG. 2, the memory system shown therein comprises a plurality of conductive lines designated L1, L2, L3 . . . LN. Each of these lines comprises a plurality of diodes D1, D2, D3 . . . DN, connected in series relationship. The diodes preferably are of the Esaki or tunnel type having a voltage-current characteristic similar to that shown in FIG. 1. The diodes are further arranged in a plurality of rows, each row including a different one element from each line. In this case, all of the D1 diodes are arranged in a first row, the D2 diodes in a second row, et cetera.

Information is read-in or stored in the memory system of FIG. 2 by switching preselected ones of the diodes therein from one stable state to the other. The means by which the present invention effectes such switching may best be described by first referring to the chart of FIG. 1. Let it be assumed that a steady-state current $I_S$ is applied through a tunnel diode. This may be indicated on the chart by a constant-current load line $I_S$ passing through the ordinate. This load line intersects the positive resistance regions I and III of the voltage-current characteristic at the points A and B respectively. Accordingly, the points A and B define the two stable operating points of the diode with a constant current $I_S$ flowing therethrough. Furthermore, it may be seen from the chart that a certain minimum voltage is required to move the diode from stable operation at point A to stable operation at point B.

Let it further be assumed that means are provided for causing a biasing current $I_B$, larger than the steady-state current $I_S$, to pass through the diode. This may be represented on the chart by a constant-current load line $I_B$ passing through the ordinate. This load line intersects the positive resistance regions I and III of the voltage-current characteristic at the points X and Y, respectively. Accordingly, the points X and Y define the two stable operating points of the diode with a constant current $I_B$ flowing therethrough. In this case, also, it may be seen from the chart that a certain minimum voltage is required to switch the diode from stable operation at point X to stable operation at point Y. Furthermore, it is evident from the chart that the minimum voltage required to switch the diode from point X to point Y is less than that required to switch the diode from point A to point B, and that the difference between these minimum voltages is related to the difference between the currents $I_S$ and $I_B$.

With the above as a background, read-in circuit means in accordance with the invention may now be described. In the embodiment of FIG. 2, the read-in circuit means provided includes a different pair of current generators CGS1, CGB1; CGS2, CGB2; CGS3, CGB3 . . . CGSN, CGBN for each of the conductive lines L1, L2, L3 . . . LN, respectively. The CGS current generators are adapted to apply a steady-state current $I_S$ to their associated lines, while the CGB current generators are adapted to apply a biasing current $I_B$. Means, symbolically shown by the switches S1, S2, S3 . . . SN, are associated with each pair of generators, respectively, to permit the selective application of either a current $I_S$ or a current $I_B$ to the associated line. In this way, it becomes possible to apply selectively either a steady-state current or a biasing current to all of the series diode elements in a given line.

The read-in circuit also includes means for applying a switching voltage across the elements in selected ones of the above-defined rows. The values of this switching voltage should be less than the minimum value required to swtich a diode from operating point A to operating point B on the chart (FIG. 1), but at least equal to the minimum voltage required to switch the diode from the operating point X to the operating point Y. This means, therefore, that the application of such a switching voltage to a given row of elements will switch only those elements in that row which are in a biased condition; that is to say, at the operating point X rather than at the operating point A.

A means for selectively applying the switching voltage to a given row is shown in FIG. 2. In such means, a matrix is formed by the provision of another plurality of conductive lines H1, H2, H3, H4 . . . HN, H(N+1). Each of the H conductive lines is A.C. coupled to each of the L conductive lines through an individual capacitor C for each coupling; or stated otherwise, a separate capacitor bridges each crossing of an L and H conductive line in the matrix. Furthermore, the crossings in the matrix are arranged such that each adjacent pair of H lines includes only the elements of a different one of the above-defined rows therebetween.

Means are then provided for selectively applying a voltage pulse across each adjacent pair of H lines. These pulse means may comprise, for example, a pulse generator PG1, PG2, PG,3 . . . PGN, for each of the rows, respectively. Means, symbolically shown by the switches PS1, PS2, PS3 . . . PSN, respectively, are associated with each pulse generator to permit the selective application of either a voltage pulse or no voltage pulse to the associated row. The voltage pulse produced by a given generator may advantageously be coupled to its associated row through a transformer, T1, T2, T3 . . . TN, respectively. Note that a resistor R is provided in each of the L lines so that the line H(N+1) is not shunted to ground.

The reading of information into the system of FIG. 2 may then be effected in the following manner. Let it be first assumed that the normal stable condition for all of the diode elements in the system is the region I (FIG. 1).

Second, let it be assumed that the information to be stored may be represented by the switching of the diode D3 in the conductive line L2 to the region III stable condition. The read-in circuit means must, therefore, be capable of selecting the diode D3 in line L2, from among the plurality of diodes in the system, and of switching it from its normal state in region I to its region III state.

The first step in effecting this end is to apply a biasing current $I_B$ to the line L2, a steady-state current $I_S$ being applied to the remainder of the lines. This is shown symbolically in FIG. 2 by the positions of the switches S, wherein only the switch S2 is connected to the CGB generator. The second step is to apply a switching voltage across only the adjacent pair of conductive lines H3 and H4. This is shown symbolically in FIG. 2 by the positions of the switches PS, wherein only the switch PS3 is connected to a pulse generator.

The pulse applied across the lines H3 and H4 finds a path through each of the D3 elements arranged between those lines via the capacitors coupling the H3 and H4 lines to each of the lines L1 . . . LN. Furthermore, as shown by the arrows, due to the much smaller impedance to the pulse of the capacitors in comparison to that of the diodes, the path of this pulse is, for all practical purposes, confined only to the diodes D3. As a result, switching voltage is applied only to the diodes D3. It will be remembered, however, that the value of this voltage is sufficient to switch only a diode biased at the $I_B$ level from the region I into the region III. Of all the diodes D3, only the one in line L2 fulfills this condition. Consequently, only the diode D3 in the line L2 is switched by the read-in circuit means.

It is evident that any other diode or plurality of diodes in the system may be selected and switched by the read-in circuit means provided. Further, the same read-in circuit means may be utilized to reset all the diodes to their original state by supplying through the transformers T pulses of the appropriate magnitude and polarity.

Figure 3:
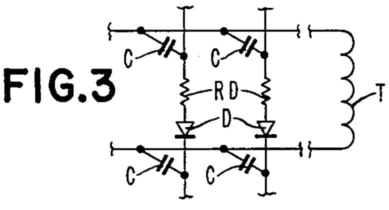
FIG. 3 is a partial schematic diagram of a memory system similar to that of FIG. 2 but with an alternative switching feature.

It should be noted the magnitude of the voltage pulse required to effect the switching of a diode may be increased by associating a series resistance RD (FIG. 3) with each diode in the system. This measure may be desirable in order to prevent low level spurious signals and the like from accidentally switching a biased diode.

Figure 4:
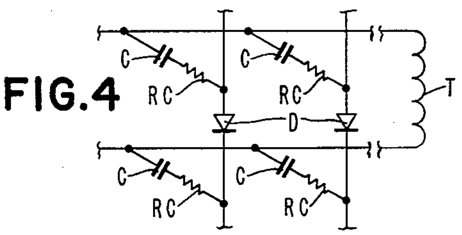
FIG. 4 is a partial schematic diagram of a memory system similar to that of FIG. 2 with still another alternative switching feature.

As shown in FIG. 4, the same effect may be accomplished by adding an impedance RC in series with each capacitor C. In that event, the capacitor and impedance combined with the transformer T may be considered to supply a current pulse to the diode which, in order to effect diode switching, must increase the diode current above the critical value $C_1$ (FIG. 1).

It is, of course, necessary to be able to recover or read-out the information stored in a memory system if such information is to serve a useful purpose. In the memory system of FIG. 2, such read-out involves detecting which ones of the diode elements have been switched by the read-in circuit. The present invention provides circuit means whereby such detection may be non-destructively effected. Non-destructive read-out serves a useful purpose when it is desired to repeatedly utilize the stored information.

One such read-out circuit comprises an individual sensor means for each of the conductive lines L1 . . . LN, the sensor means being adapted to detect a D.C. voltage change in time on its associated line. The reason that such a sensor serves to detect a switched element may be seen from an investigation of the chart of FIG. 1. The chart indicates that an element in the region I state is at a lower voltage level than an element in the region II state. Accordingly, prior to the time that an element is switched, a first voltage appears on the line associated with that element, while a second different voltage appears on the line after the element has been switched. Thus, the detection of a change in voltage on a given line, associated with the identification of the pulse generator causing such voltage change, serves to establish the co-ordinates of the switched diode and, consequently provides read-out. The association between line and column during read-out is temporal in nature, i.e. the pulse generators are energized in time sequence so that only one row of storage elements is read-out at a time. Therefore, when an output indication appears on one of the sensor units, it is automatically associated with the pulse generator energized at that time. In the embodiment of FIG. 2, the means for carrying out this temporal association comprises manually operated switches PS1 through PSN. In more sophisticated embodiments, automatic read-out switching systems can be provided, many of which are well known in the art.

By way of example, a different sensor means SE1, SE2, SE3 . . . SEN, respectively, capable of providing an indication of voltage change in time is connected to each of the L lines. The sensors are shown in FIG. 2 in block form in view of the well-known nature of the component elements employed. Each sensor includes a differential amplifier circuit 10 having a pair of inputs connected to the associated line. A differential amplifier is characterized by the ability to detect a voltage difference across its inputs at any instant in time. In order to adapt it to be able to detect a voltage change in time, a delay circuit 11 is connected between one of its inputs and the line. Thus, the voltages, arriving at the same time at the inputs of the differential amplifier, actually occur at different times on the line and the desired detection of voltage change may be accomplished.

Figure 1:
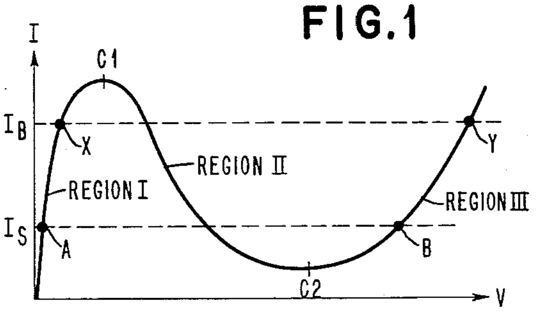
FIG. 1 is a chart showing the typical voltage-current relationship of a tunnel diode.

Another means of non-destructive read-out provided by the invention may best be described by first referring to the chart of FIG. 1. There it will be seen that the slope of the voltage-current characteristic in region I differs from the slope in region III. The slope of the voltage-current characteristic of an element is indicative of the dynamic, alternating-current resistance of that element. Accordingly, each of the diode elements in the memory system of FIG. 2 has a different dynamic resistance depending upon which one of its stable states it is in.

Referring now to FIG. 2, the alternative read-out means provided by the invention includes means for applying an A.C. potential difference selectively across each of the rows in the system. Such means may comprise an alternating-current voltage generator VG1, VG2, VG3 . . . VGN, respectively, adapted to be selectively switched across the transformer, T1, T2, T3 . . . TN, respectively, by means of the switch, PS1, PS2, PS3 . . . PSN, respectively.

As shown by the arrows in the row between the lines H3 and H4, for example, this A.C. voltage sees in each row a plurality of parallel circuits, each circuit comprising a diode element D and a pair of capacitors C in series arrangement. Accordingly, the A.C. voltage is divided across the diode and capacitor elements of each series circuit. Furthermore, the ratio of this division is dependent upon the dynamic resistance of the diode element since a constant A.C. voltage is provided by the secondary of the transformer T. Thus, when a diode is in its region I state, where the dynamic resistance is relatively low, a relatively small portion of the applied alternating current voltage will appear thereacross, while a comparatively larger portion will appear across the same diode in its region III state, where the dynamic resistance is relatively high. Advantageously, the resistance of the capacitor C at the frequency of the applied A.C. voltage should be larger than the impedance of the diode element.

Accordingly, the detection of a switched diode may be effected by searching each of the rows in the system with a read-in alternating-current voltage by means of the generators VG1–VGN and the switches PS1–PSN. If none of the diodes in a given row has been switched, the voltage on each of the lines produced by the application of a read-in voltage to that row will indicate that condition. On the other hand, if one of the diodes in the row has been switched, the voltage on the line associated with that diode will differ in amplitude from the voltage on the other lines. The detection of this difference in voltage in that line and the identification of the row then being scanned provides information as to the state of the diode causing the difference and, consequently, provides read-out. The means for detecting such differences in voltage may take the form of conventional amplitude sensitive devices, such as A.C. voltmeters V1, V2, V3 . . . VN, individually connected at the top of the lines L1, L2, L3 . . . LN, respectively.

It is to be understood that the above described arrangements are simply illustrative of the application of the principles of the invention. Numerous other arrangements may be devised by those skilled in the art which embody the principles of the invention and fall within the spirit and scope thereof.

What is claimed is:

1. A memory system, comprising a plurality of first conductive lines, each of said lines including a plurality of bistable electrical elements connected in series relationship, said elements being further arranged in a plurality of rows, each row including a different one element from each said line, each said element having a voltage-current relationship which is characterized by a negative resistance region between two positive resistance regions, said positive resistance regions having different dynamic alternating-current resistance values, said element being stable in either of said positive resistance regions, read-in circuit means for switching preselected ones of said elements from one said stable state to the other, including means for applying a preselected biasing current to selected ones of said first lines to bias the elements in said lines, and switching means for applying a voltage pulse across the elements in selected ones of said rows, the value of said voltage pulse being such as to switch only the biased elements in said selected rows, said switching means including a plurality of second conductive lines arranged to form a matrix with said first conductive lines, an individual capacitive means bridging each crossing of a first and second conductive line, said crossings being arranged such that each adjacent pair of said second lines includes only the elements of a different one of said rows therebetween, and means for selectively applying a voltage pulse across each of said adjacent line pairs, and read-out circuit means for detecting which ones of said elements have been switched, including means for applying an alternating-current read-out voltage difference across selected ones of said adjacent line pairs, and an individual sensor means for each of said first conductive lines for providing an indication of the amplitude of the voltage appearing on its associated line in response to the application of said read-out voltage.

2. A memory system, comprising a plurality of conductive lines, each of said lines including a plurality of bistable electrical elements connected in series relationships, said elements being further arranged in a plurality of rows, each row including a different one element from each said line, each said element having a voltage-current relationship which is characterized by a negative resistance region between two positive resistance regions, said element being stable in either of said positive resistance regions, read-in circuit means for switching preselected ones of said elements from one said stable state to the other, including means for applying a preselected biasing current to selected ones of said lines to bias the elements in said lines, and means for applying a switching voltage across the elements in selected ones of said rows, including a second plurality of conductive lines arranged to form a matrix with said first plurality of conductive lines, an individual capacitive means bridging each crossing of a first and second conductive line, said crossings being arranged such that each adjacent pair of said second plurality of lines includes only the elements of a different one of said rows thereinbetween, and means for selectively applying a voltage pulse across each of said adjacent line pairs, the value of said voltage being such as to switch only the biased elements in said selected rows.

References Cited in the file of this patent

UNITED STATES PATENTS

| | | |
|---|---|---|
| 2,845,611 | Williams | July 29, 1958 |
| 2,907,000 | Lawrence | Sept. 29, 1959 |
| 2,914,754 | Ganzhorn et al. | Nov. 24, 1959 |
| 2,958,074 | Kilburn | Oct. 25, 1960 |
| 2,966,599 | Haas | Dec. 27, 1960 |
| 2,978,576 | Watters | Apr. 4, 1961 |
| 3,003,139 | Perkins | Oct. 3, 1961 |
| 3,017,613 | Miller | Jan. 16, 1962 |

OTHER REFERENCES

Publication: IBM Tech. Disclosure Exclusive "OR" Circuit, by L. A. Russell, vol. 2, No. 1, June 1959.